Patented Oct. 30, 1928.

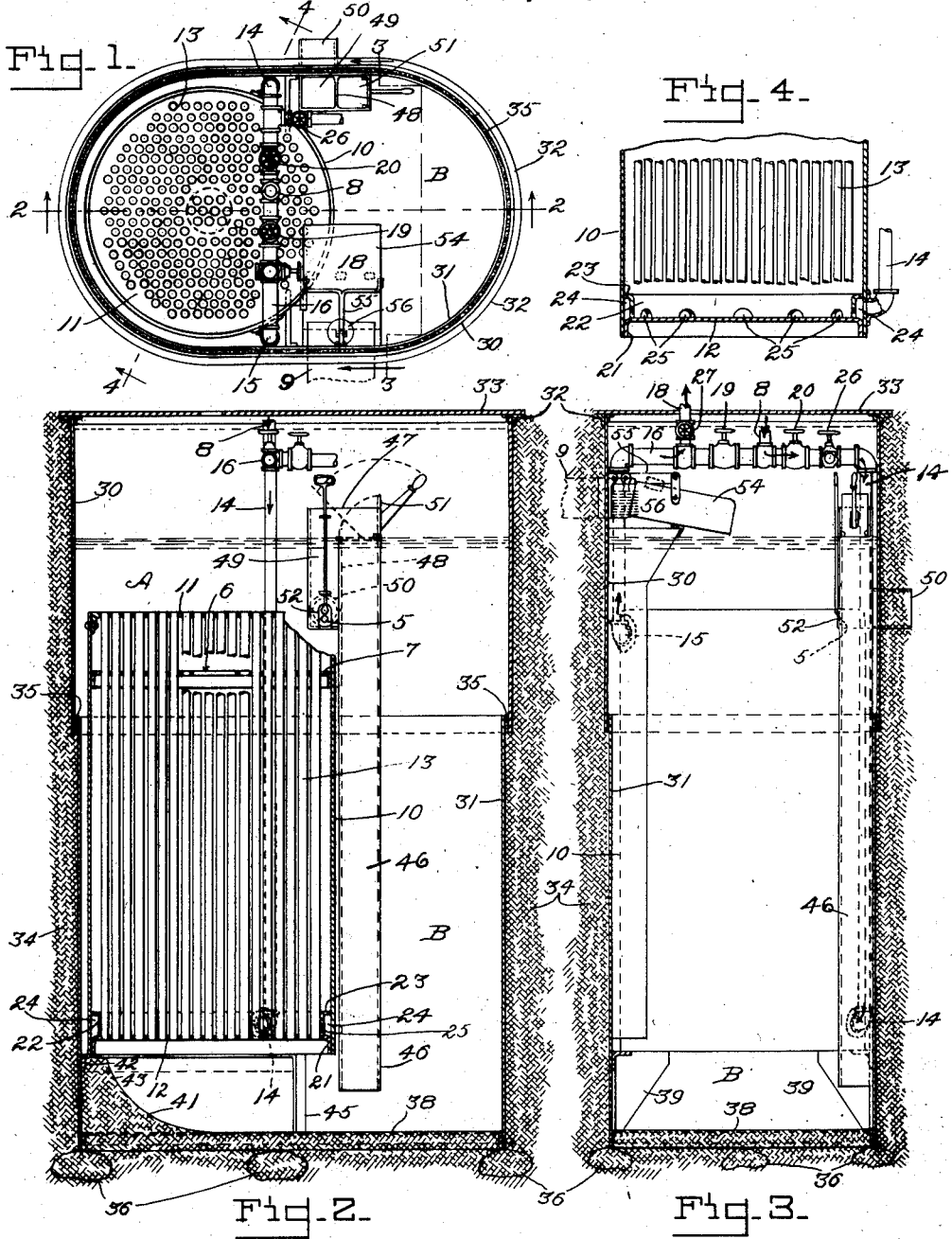

1,689,993

UNITED STATES PATENT OFFICE.

FRED S. BOLTZ, OF MANSFIELD, MASSACHUSETTS.

SOIL-WATER CATCH BASIN AND HEAT RECLAIMER.

Application filed February 17, 1926. Serial No. 88,908.

The invention has for one object to provide an apparatus for utilizing the heat of a heated fluid which has already been used but is still hot and which usually is allowed to run to waste, such as water which has performed its function in a laundry, dye house, wool scouring plant or elsewhere.

Another object of the invention is to provide a combination catch basin and heat reclaiming apparatus.

Other objects and features of the invention will be more particularly set forth and claimed hereinafter.

The invention will be fully understood from the following description when taken in connection with the accompanying drawings and the novel features thereof, will be pointed out and clearly defined in the claims at the close of this specification.

In the drawings:

Fig. 1 is a plan view of the apparatus with the cover removed.

Fig. 2 is a vertical sectional view on line 2—2, Fig. 1.

Fig. 3 is a vertical sectional view on line 3—3, Fig. 1.

Fig. 4 is a section on line 4—4, Fig. 1, partly broken away.

Referring to the drawings, there is shown at A a unitary heating apparatus having a hollow cylindrical shell 10 set in vertical position having tube sheets 11, 12 at its upper and lower ends respectively, and tubes 13 extending vertically through the shell and connected with the tube sheets, the said tubes being open at each end to the interior of the catch basin B in which it is set.

The hot soil water from the catch basin will enter the tubes 13 at their upper ends as will be hereinafter described.

An inlet pipe 14 for the fresh water which is to be heated enters the shell 10 through an inlet aperture in the wall near the lower end thereof just above the lower tube sheet, the lower end of said pipe being open to allow the fresh water to pass into the shell and thence to pass upward around the tubes 13 to the fresh water outlet 15 through the side wall of the shell just below the upper tube sheet 11. The fresh water will be heated as it passes along the tubes through the shell. The fresh water outlet pipe 15 conveys the heated fresh water to places of use.

The fresh water inlet pipe 14 is connected with a suitable source having a head pressure, preferably being connected with the city water supply so that pressure will act on the water to force it upward from the bottom of the shell. In the form shown in the drawings the fresh water is supplied to the pipe 14 by a supply pipe 8 tapped into the transverse pipe 16. The fresh water when heated is conveyed away by a pipe 18 tapped into the pipe 16.

The shell 10 extends slightly below the bottom tube sheet 12 and rests on suitable supports rising from the bottom of the catch basin as will be hereinafter described. The said tube sheet 12 is formed with a downwardly extending annular flange 21 which is inside of the shell and also rests on said supports.

On the inside of the shell just above the bottom tube sheet there is a flanged ring 22 of somewhat less diameter than the inner diameter of the shell and resting on the bottom tube sheet so that there is formed an annular space 24 between the vertical wall of the shell and the ring. This ring has at its upper end an annular horizontal flange 23 which extends radially outward to the inner periphery of the shell, so that it closes the top of said annular space. The fresh water inlet pipe 14 communicates with the said annular space 24 through an aperture in the wall of the shell.

The peripheral side wall of said ring is formed with perforations 25 at intervals opening into the interior of the shell, so that the water from the inlet pipe may be distributed through said perforations and spread around the tubes 13.

A baffle plate 7 is provided which extends transversely across the interior of the shell a short distance below the outlet 15, said baffle being apertured for the passage of the tubes 13 and having a central aperture 6 through which all of the fresh water must pass before it can reach the outlet 15. This causes the fresh water to take an indirect course as well as to retard its movement and thus come more completely into contact with the hot tubes as well as remain a longer time subject to their heating effect.

*The catch basin.*

The said shell and its connected parts are set within the catch basin B somewhat above the bottom thereof. The catch basin should be water tight.

The catch basin consists of a shell, preferably oval shaped in horizontal section, made preferably of metal and preferably also formed in sections 30, 31 one on top of another to facilitate handling and installation and mounted upon a suitable base which closes the lower end. The top section 30 is provided with an annular outwardly extending flange 32 to enable it to be secured to the floor or other suitable support. It is provided with a cover 33. The lower section 31 which as well as the upper section 30 is oval in shape, is preferably concentric with the upper section 30 and of slightly less diameter than the upper section so that it may be lowered into place through the upper section without disturbing the upper section. This is to permit the upper section to be installed as soon as the pit in the ground 34 has been dug deep enough for it and to allow it to remain undisturbed while the pit is further deepened to receive the other section 31 which may be lowered down through the upper section in telescopic fashion.

When the lower section 31 is in place, the upper end will extend somewhat above the lower end of the upper section and the lapping portions will be secured together by any suitable means to form a tight joint or if spaced apart a suitable packing or filling may be introduced between the lapping portions to make a tight joint. Preferably this is done by grouting 35 in cement or other suitable material.

It is not essential, however, that the lower section be of the lesser diameter. If desired, the section which is first introduced might be lowered as the pit is deepened and thus finally become the bottom section and then the other section may be introduced on top of the section first inserted and jointed thereto by a broken or lap joint or in any other suitable way. In preparing the pit in the earth for the metal shell which forms the catch basin, the workmen may dig a hole conforming to the general oval shape of the shell until it reaches a depth where caving is feared (or the depth required for the upper section 30 if the concentric telescopic form of section first described is employed) then the section 30 is lowered in place; or if the second described form of lap sections is to be used, the section first introduced will be the one which is to be still further lowered. When the pit in the earth is dug to the full depth desired there should be placed on the bottom thereof temporary supports for the lower section 31 until the bottom can be covered with a water tight base. The temporary supports 36 as shown in the drawings are stones.

The bottom 38 for the catch basin is made of concrete or other suitable material to form a hard, smooth and practically water tight bottom so that the soil water will not leak through it and to act as a permanent setting or base for the catch basin section 31. The lower end of the shell 31 has on its inner periphery an annular projection 39 which rests on the concrete bottom. This projection is shown as an annular angle plate. Preferably the concrete bottom is carried up higher on one side than on the other, as shown at 41 and the lower section 31 of the catch basin has a flange or projection 42 which rests on the top of this higher portion 41 of the concrete bottom. This higher portion 41 has an inclined inner face 43, preferably concaved. The purpose of this inclined face is to deflect the liquid in the bottom of the basin toward that portion of the basin into which the lower end of the overflow pipe 46 extends. Upright supports 45 are provided resting on the longitudinal part of the concrete bottom and rising to the same height as the inclined wall 41 of the bottom to cooperate with the said wall 41 to support the shell 10.

A soil water overflow pipe 46 is provided through which the soil water after being cooled by passing down through the cool fresh water will be carried from the lower part of the catch basin up above the top of the hot soil water tubes 13 and thence be discharged to the sewer. This overflow pipe 46 is open at its lower end into the catch basin near the bottom of the catch basin so that the soil water can enter it. Said pipe 46 extends up outside of the shell 10 within the catch basin to a point somewhat above the normal level of the hot soil water in the catch basin as shown at 47. The upper part of said pipe is enlarged in area from a point somewhat slightly below the top of the shell 10 by providing an extension on one side. A vertical partition 48 which serves as a baffle plate extends upward between the said side extension and the main body of the overflow pipe 46. This baffle extends up to about the normal level of the liquid but not to the full height of the pipe 46. The baffle 48 is shown as an upward extension of the inner side wall of the main body of the pipe 46. This forms a chamber 49 in said side extension into which the soil water which comes up from the bottom of the basin will flow over the top of the baffle 48 which serves as a dam. An outlet pipe 50 leads from the lower part of said chamber 49 to carry the cooled soil water to the sewer or other discharge point.

The pipe 46 is open at the top. A door or valve 51 is provided in that side of pipe 46 which is opposite the baffle 48 above the normal level of the liquid, this door being usually closed so that the liquid coming up through pipe 46 will flow over the top of the baffle plate 48 into the chamber 49 and thence to the discharge pipe 50.

The soil water enters the catch basin B through an inlet pipe 9.

The cold fresh water coming into the shell will at first cool the hot soil water in the tubes while in turn the hot soil water in the tubes will heat the fresh water in the shell; also the hot soil water in the basin surrounding the shell will keep the shell warm which in turn will help heat the fresh water therein. The fresh water will naturally rise as it is heated and the head pressure on incoming cold fresh water will facilitate the circulation.

The hot soil water from the catch basin will enter the tubes 13 at the open upper ends. The soil water which is in the tubes will be slightly cooler than the hot soil water surrounding the shell, and therefore a free circulation of the soil water will take place, down through the tubes 13 and thence to the open lower end of the overflow pipe, through which it will be forced by the pressure of the constantly inflowing soil water.

What I claim is:

1. An apparatus of the character described comprising a shell having tube sheets in its opposite ends and tubes extending through the shell and connected with said sheets, said tubes being open at their ends, a source of fresh water supply, a pipe connected therewith adapted to introduce fresh water into the shell, an outlet pipe leading from the shell through which the fresh water is normally discharged, in combination with a soil water catch basin in which said shell is enclosed and mounted in such manner that the said tubes are open at both ends to the soil water in the basin, an overflow pipe extending from the lower part of the basin below the bottom of the shell to a point some distance above the top of the shell, and having a discharge outlet to a suitable place outside of the basin.

2. An apparatus of the character described comprising a tubular shell having tube sheets at its ends and a series of tubes connecting said tube sheets and open at their ends, a soil water catch basin in which said shell is set in such position that both ends of the tubes are open to the soil water, a fresh water inlet pipe opening into said shell in such manner that the fresh water will be distributed around the said tubes, an outlet for the fresh water, an overflow pipe extending from the lower part of the basin to a point some distance above the top of the shell, a branch chamber connected with said overflow pipe at or near its upper end, a baffle plate between the main overflow pipe and said chamber over which the contents of the overflow pipe pass into said chamber and a discharge pipe leading from said chamber.

3. A catch basin for soil water comprising, a soil water inlet at or near the upper end of the basin, an overflow pipe extending from the lower part of the basin to the upper part thereof, an outlet from the upper part of said overflow pipe communicating with a discharge outlet from the upper part of the basin, and a shell enclosed within the basin having tube sheets at the top and bottom ends and having a plurality of tubes extending vertically through the shell and open at the ends to form a passage for the soil water therethrough, means for conducting fresh water into said shell and around said pipes and a discharge pipe for the fresh water from the upper part of the shell leading outside of the basin.

4. An apparatus of the character described comprising a catch basin for the soil water, a soil water inlet opening into the upper part of said basin, a soil water outlet pipe extending from near the bottom of said catch basin to a point above the normal level of the soil water in the basin, said outlet pipe having a discharge outlet near its upper end to a point outside the catch basin, a shell enclosed within said catch basin having tube sheets at its upper and lower ends and a plurality of vertical tubes connecting said tube sheets and open at both ends to the soil water in the catch basin, means for introducing fresh water into said shell, and an outlet to carry the fresh water from the upper part of said shell and out of the catch basin without mingling with the soil water.

5. An apparatus of the character described comprising a shell having tube sheets at its ends and tubes extending through the shell and connected with said tube sheets, said tubes being open at each end to soil water, a fresh water inlet pipe opening into the lower part of said shell, an outlet pipe for the fresh water leading from the upper part of said shell and a baffle plate extending transversely of the interior of said shell a short distance below the upper tube sheet, said baffle plate being formed with apertures for the passage of the said tubes and having an opening through which the fresh water must pass from the portion of the shell below said baffle into that portion of the shell above the baffle and thence to the outlet.

6. A waste water heat extractor comprising a waste water chamber through which warm waste water passes, a heat transfer element within said waste water chamber consisting of a chamber through which clean water passes and tubes within said chamber having both ends open to the waste water, the walls of said tubes being exposed to contact with the clean water in the clean water chamber and a waste water over-flow pipe open at its lower end to the waste water in the lower part of the waste water chamber and having a discharge outlet to a place outside of the waste water chamber.

7. A waste water heat extractor comprising a waste water receptacle into and out of which the waste water passes, a clean water chamber enclosed within said waste water receptacle; a heat transfer element consisting of tubes mounted in said clean water chamber, both ends of said tubes being open to the waste water in said receptacle, the clean water chamber having an inlet and an outlet opening whereby clean water is admited to the chamber for contact with the walls of the waste water tubes and then passes out without mingling with the waste water, and a waste water over-flow pipe open at its lower end to the waste water in the lower part of the waste water chamber and having a discharge outlet to a place outside of the waste water chamber.

8. Apparatus of the character described having a waste water catch basin, a shell set in said basin having tube sheets at its upper and lower ends, a series of tubes connecting said sheets and open at their ends to the waste water in said basin, the upper ends of the said tubes being below the top of the waste water basin and the lower ends of the tubes being above the bottom of the basin, a waste water over-flow pipe open at its lower end to the waste water in the lower part of the basin, the upper end of said over-flow pipe extending above the upper ends of said tubes and having a discharge outlet to a suitable place outside of the basin, an inlet for admitting clean water into the said shell and an outlet for the clean water at or near the top of the shell after circulation around the waste water tubes.

9. A waste water heat extractor having a catch basin, an inlet thereto for warm waste water, an over-flow pipe open at its lower end to the waste water in the lower part of the basin and conducting the waste water out of the basin in combination with a heat transfer element comprising a shell suspended in said basin, means for conducting clean water into said shell and thence out of said shell to a suitable place outside of the basin and conduits for the waste water in the basin which extend through the clean water in the shell whereby the heat from the waste water passing through the said conduits is conducted by the walls of the conduits to the clean water in the shell without mingling the waste water with the clean water.

10. A waste water heat extractor having a catch basin, an inlet thereto for warm waste water, in combination with a heat transfer element comprising a shell suspended in said basin, means for conducting clean water into said shell and thence out of said shell to a suitable place outside of the basin, conduits for the waste water in the basin which extend through the clean water in the shell whereby the heat from the waste water passing through the said conduits is conducted by the walls of the conduits to the clean water in the shell without mingling the waste water with the clean water, and a waste water over-flow pipe open at its lower end to the waste water in the lower part of the waste water chamber and having a discharge outlet to a place outside of the waste water chamber.

In testimony whereof I affix my signature.

FRED S. BOLTZ.